US005826903A

United States Patent [19]
Schiller et al.

[11] Patent Number: 5,826,903
[45] Date of Patent: Oct. 27, 1998

[54] AIR BAG DEPLOYMENT TRIGGER SENSOR WITH SACRIFICIAL WAVEGUIDE

[76] Inventors: Norman H. Schiller; Chantal G. Schiller, both of 163-16 Willets Point Blvd., Whitestone, N.Y. 11357

[21] Appl. No.: 800,478

[22] Filed: Feb. 14, 1997

[51] Int. Cl.⁶ .................................................... B06R 21/32
[52] U.S. Cl. ............................................................ 280/735
[58] Field of Search ............................................. 280/735

[56] References Cited

U.S. PATENT DOCUMENTS

| 5,007,661 | 4/1991 | Lenzen | 280/735 |
| 5,335,749 | 8/1994 | Taguchi et al. | 180/274 |
| 5,460,407 | 10/1995 | Stückle | 280/741 |
| 5,629,681 | 5/1997 | Du Vall et al. | 340/665 |

OTHER PUBLICATIONS

Blaisdell and Stephens, "Collision Performance of Automotive Door Systems", Collision Research & Analysis, Inc., Volkswagen of America, No.940562.
Mackay, "Smart Seat Belts—Some Population Considerations Applied to Intelligent Restraint Systems," Birmingham Accidnet Research Centre, No. 940531.
Kanamoto, et al., "Electronic Crash Sensing Unit for Airbag," NEC Home Electronics, Ltd., No. 940624.
Breed, et al., "A Critique of Single Point Sensing," Automotive Technologies International, Inc., No. 920124.
Huang, "Dynamics and Animation of an Air Bag Ball–in–Tube Sensor System," Ford Motor Company.
"Light Modulation Photo IC S4282–11 for Optical Synchronous Detection," Hamamatsu Technical Information, Sep. 1990.
Breed, "Electro–Mechanical Acceleration Sensors and Integrators," Automotive Technocologies Information, Inc., Sensors Expo Proceedings, 1990.
Breed and Castelli, "Trends in Sensing Frontal Impacts," Automotive Technologies International, Inc., Sensors Expo Proceedings, 1990.
"Advances In Airbag Materials Keep Market Exploding" Inside Automotive, Mar./Apr. 1995, pp. 46–53.
"Light Modulation Photo IC's S4282–11, S5943, S4282–51, S4285–61 For Optical Synchronous Detection Under High Background Light Condition", Hamamatsu Technical Data, 1995.
"Side–Impact Airbag Systems" Automotive Industries, Feb. 1995, pp.106–107.
Brooke, "Side–Impact Airbag Systems", Automotive Industries, Feb. 1995, p.104.
Bozeat and Loni, "Silicon–based Waveguides Offer Low–cost Manufacturing", Laser Focus World, Apr. 1995.
Jost, "Side Impact and Sensing", Automotive Engineering, May 1995.
Booklet on Airbags, NEC Technologies, Inc. Automotive Electronics, 1995.
"Side–Impact Airbag Systems", Automotive Industries, Feb. 1995, p. 110.
"Electronics & Sensors", Takata Total Safety Systems, 1995. Automotive Engineering, SAE International, Feb. 1996.

Primary Examiner—Kenneth R. Rice
Attorney, Agent, or Firm—Sofer & Haroun LLP

[57] ABSTRACT

An air bag deployment trigger sensor for activating the deployment of an air bag in a vehicle as a result of an impact or collision. The air bag deployment trigger sensor utilizes a sacrificial waveguide which transmits optical signals from an emitter along the waveguide, and which are received by a detector. A sensor circuit attached to the detector senses the optical signal and decodes, measures, or compares the optical signal with a predetermined electrical signal produced by the detector. The sensor's detection of an alteration or interruption of the optical signal along the waveguide triggers air bag deployment.

29 Claims, 4 Drawing Sheets

AIR BAG DEPLOYMENT TRIGGER SENSOR WITH SACRIFICIAL WAVEGUIDE

FIELD OF THE INVENTION

This invention relates to an air bag deployment trigger sensor, and in particular, to a device for triggering the deployment of an air bag within a vehicle after an impact resulting from a collision.

BACKGROUND OF THE INVENTION

The response time from an impact to initial air bag deployment is extremely important for minimizing injury to one or more occupants in a vehicle which is involved in a collision. Every microsecond or millisecond saved between impact and deployment of a vehicle's air bag will substantially reduce injury in the event of an accident. As such a fast and effective air bag deployment trigger within the vehicle is essential.

Past air bag triggering devices have utilized a mechanical safing sensor also known as an inertial ball. These sensors typically include a ball and magnet arrangement in which an impact causes the separation of the ball from the magnet which in turn makes contact with two electrodes and triggers a sensor circuit leading to activation of an air bag deployment system in the vehicle. Air bag deployment is dependent upon the response time speed of its sensor and triggering device. The conventional safing sensors or mechanical triggering devices for air bag deployment have a relatively slow response time. Additionally, if more than one safing sensor or mechanical triggering device is disposed within a vehicle, all the air bags within vehicle will be deployed simultaneously. Furthermore, the ball and magnet system is large and bulky and its size prevents its placement in certain areas of a vehicle such as within a bumper. Also, the ball and magnet triggering system must be strategically placed within the vehicle in order to achieve the appropriate response upon impact. The ball and magnet triggering system may also be ineffective in certain circumstances since the ball and magnet may sometimes dislodge inappropriately thereby rendering the device prone to false deployments. For example, under some conditions, mechanical sensors may be prone to trigger by, among other things, driving over bumpy roads, banging on the vehicle, or upon slight impacts and incidental bumps directed upon the vehicle but which are below a threshold required for air bag deployment. As a result of false deployments, a vehicle owner would be forced to expend money to repack the falsely deployed air bag or to have a new one installed.

A system has recently been proposed in U.S. Pat. No. 5,335,749 to Taguchi et al. which provides an air bag triggering device having a flexible fiber optic rod arranged inside a cylindrical beam positioned within the space inside the side door of an automobile. A flexible material is also arranged inside the cylindrical beam which occupies the space between the cylindrical beam and the fiber optic. The fiber optic is connected to a light receiving portion on one end of the cylindrical beam and to a light emitting portion on the other end. In this construction, a lateral impact force to the side of the door causes a lateral deformity in the fiber optic which results in a difference in the amount of light received at the light receiving end, generally a reduced amount of light. As a result of the deformity of the fiber optic and the reduced receipt of light by the receiving end, the air bag trigger is activated resulting in inflation of the vehicle's air bag.

However, the flexible nature of the fiber optic may cause false activation of the trigger which would result in false deployment of the air bag. For example, random changes in the amount of light received at the light receiving end of a flexible fiber may cause air bag deployment. Other events such as a minor indentations in the vehicle door caused by a person leaning against the door, or driving the vehicle over a bumpy road may cause a deformity or shift the fiber optic hence causing a change in the light received by the light receiving end and causing the air bag to be falsely deployed.

Accordingly, there is a need for an air bag triggering device which is relatively compact for placement anywhere within a vehicle, which decreases deployment time for inflation of an air bag upon impact, which can be placed in a particular critical crash zone of a vehicle, and which eliminates the prevalence of false deployments inherent in the prior art.

OBJECTS AND SUMMARY OF THE INVENTION

It is thus a general object of the present invention to provide an optical device for triggering the deployment of a vehicle air bag which overcomes the disadvantages of the prior art.

A more specific object of the present invention is to provide an air bag deployment trigger sensor for placement within a vehicle and which includes an emitter, a detector, and a waveguide positioned between the emitter and the detector and across which optical rays are transmitted.

It is a further object of this invention to provide an air bag deployment trigger sensor in which an emitter transmits continuous, pulsed or encoded optical rays or signals across a rigid waveguide to be received by a detector and measured, compared, or decoded by a sensor circuit.

It is an additional object of this invention to provide an air bag deployment trigger sensor in which the breakage of a rigid waveguide as a result of an impact interrupts the transmission of light across the waveguide and in turn triggers the deployment of an air bag within the vehicle.

According to the present invention, an emitter and a detector are positioned on opposite ends of a rigid waveguide. The rigid waveguide, which is of a predetermined tensile strength, transmits the emitted optical rays from the emitter to the detector to which a sensor circuit is attached for measuring, comparing or decoding the received rays. Any direct impact which reaches or exceeds a predetermined threshold causes the waveguide to break. Breakage of the waveguide interrupts or alters the optical signal to the detector and causes a termination or differential in the signal received by the detector. When the sensor circuit detects this termination or differential signal, it triggers the deployment of the vehicle's air bag Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views.

DETAILED DESCRIPTION OF THE PRESENTLY PREFERRED EMBODIMENT

Figure 1:
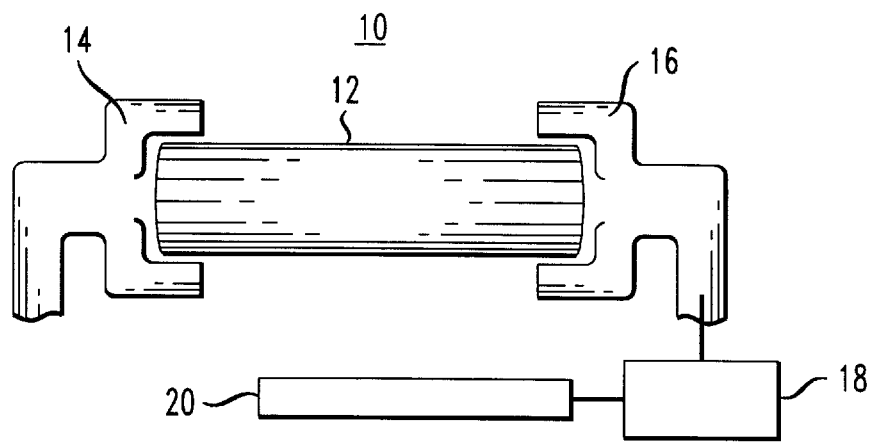
FIG. 1 illustrates an elevational view of the air bag deployment trigger sensor of the present invention.

FIG. 1 illustrates a first embodiment of an air bag deployment trigger sensor 10 according to the present invention. Reference numeral 12 denotes a breakable or sacrificial waveguide across or within which optical signals are transmitted. An emitter 14 is connected to one end of sacrificial waveguide 12. A detector 16 is connected to the other end of sacrificial waveguide 12 opposite emitter 14.

Figure 3:
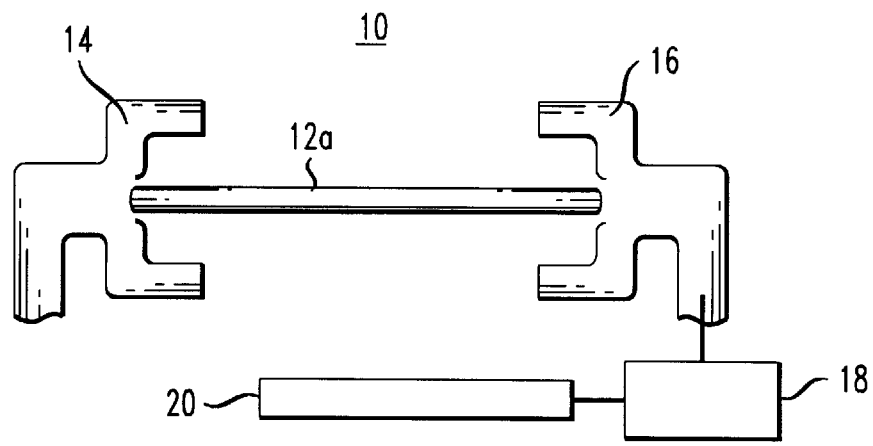
FIG. 3 illustrates an elevational view of the air bag deployment trigger sensor of the present invention illustrating a fiber optic disposed within the waveguide in accordance with one embodiment of the present invention.

Sacrificial waveguide 12 is an optical waveguide or fiber optic composed from a brittle light transmitting material such as glass, plastic, acrylic or other light transmitting materials which are known in the art, and is rigidly fixed between emitter 14 on one end and detector 16 on its opposite end, although the invention is not limited in scope in this respect. Emitter 14 may be a light emitting diode (L.E.D.), a laser diode, a lamp, a fiber or any of other numerous opto-electric light emitters known in the art. Detector 16 may be a photodiode, a photocell such as a Cadmium Sulfide (CdS) cell or other photosensitive or opto-electric detector. A sensor circuit 18, connected to detector 16, may be a comparator, or any of numerous sensors known in the art for measuring, comparing or decoding light or optical signals received by detector 16 from emitter 14. The optical signal provided by emitter 14 and which is transmitted along sacrificial waveguide 12 may be a continuous signal, a pulsed signal, or an encoded signal. FIG. 3 illustrates a fiber optic strand waveguide 12a. As illustrated in FIGS. 1 and 3, an air bag deployment system 20 is coupled to sensor circuit 18 and within the vehicle. Upon impact, sacrificial waveguide 12 is caused to break, which results in the disruption or termination of the signal from emitter 14 to detector 16. Sensor circuit 18, upon sensing a breakage in waveguide 12, provides a signal that triggers an air bag deployment system 20.

Figure 2A:
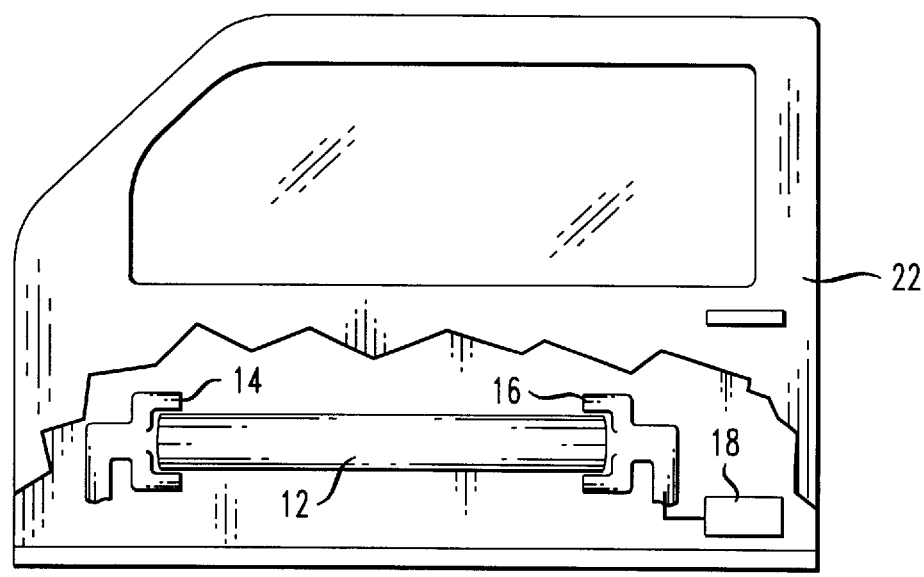
FIG. 2a illustrates a side view of a door of an automobile, partly broken away, to illustrate the arrangement of the air bag deployment trigger sensor arranged within the frame of a vehicle door in accordance with one embodiment of the present invention.
Figure 2B:
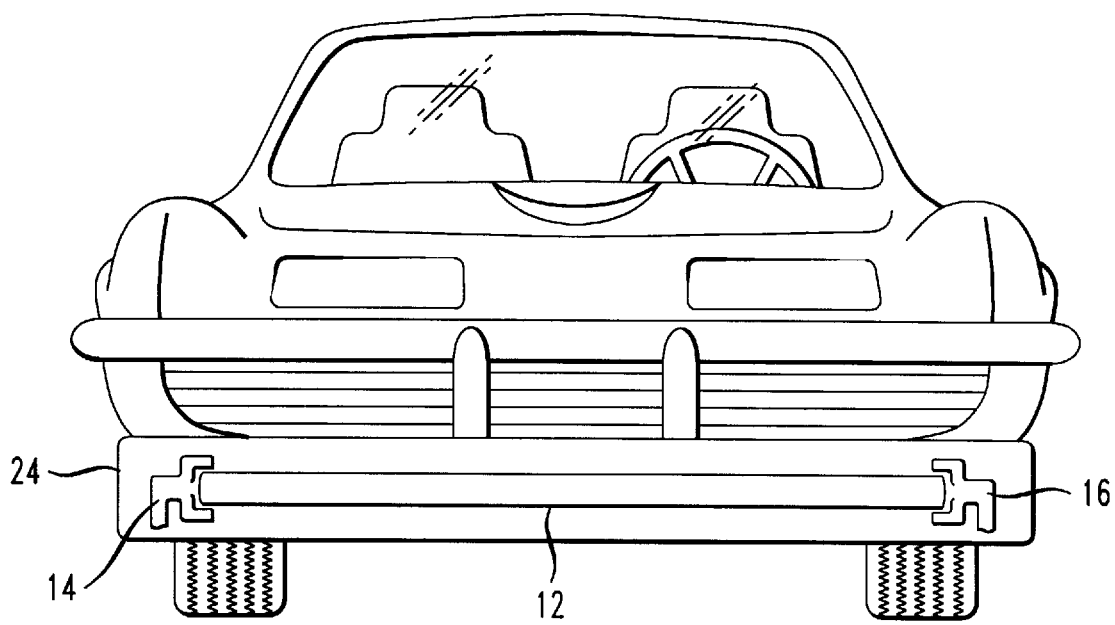
FIG. 2b illustrates a cut-away view of a front automobile bumper having the air bag deployment trigger sensor arranged within the bumper in accordance with one embodiment of the present invention.

As shown in FIG. 2a, the air bag deployment trigger sensor 10 is arranged within a space inside a vehicle door assembly 22. In this configuration, air bag deployment trigger sensor 10 advantageously provides protection to a driver or vehicle occupant upon an impact to the side of the vehicle. The air bag deployment trigger sensor 10 of present invention is not, however, limited to placement within a vehicle's door assembly, and may be strategically placed anywhere within a vehicle where protection from an impact is desired. A vehicle may comprise one or numerous air bag deployment trigger sensors 10 placed in various areas of the vehicle. The air bag deployment trigger sensor 10 may be mounted to either the interior or exterior surface of a vehicle's side panels, or in the front and rear of a vehicle, generally on the interior or exterior of the front and rear bumpers. In this manner, depending on the sensor circuit(s) 18 employed, the air bag deployment trigger 10 is capable of providing protection from front, rear and/or side impact by triggering a single individual air bag deployment system 20 within a particular area of a vehicle or by triggering all the air bag deployment systems 20 simultaneously. In FIG. 2b there is illustrated the air bag deployment trigger sensor 10 arranged within the front bumper 24 of an automobile. The air bag deployment trigger sensor 10 may be similarly arranged within the rear bumper (not shown) of an automobile. However, the invention is not limited in this respect and air bag deployment trigger sensor 10 may be disposed in any desired location in the vehicle.

In the embodiment illustrated in FIGS. 1–3, emitter 14 provides an optical signal which is transmitted across sacrificial waveguide 12 and received at detector 16. As discussed above, the optical signal may be one which is continuously emitted from emitter 14, or it may be pulsed or encoded. Sensor circuit 18 is configured to receive electrical signals from detector 16 so as to measure or compare the received signal against a predetermined threshold signal. The electrical signal may be a current or voltage signal depending on the type of detector 16 and circuit 18 employed. Under normal circumstances the signal received by the sensor circuit 18 remains continuous, pulsed or encoded and a status quo is retained. Sensor circuit 18 preferably comprises any conventional design configured to sense a sudden change in amplitude of an electrical signal, such as a comparator or amplifier. For example, when sensor circuit 18 employs a comparator it compares the received signal against the predetermined current or voltage signal threshold. Under normal circumstances the received signal is equivalent to that which was emitted from emitter 14. When a vehicle is involved in a collision, an impact of sufficient force which meets or exceeds a predetermined threshold causes the sacrificial waveguide 12 to break. Breakage of the sacrificial waveguide 12 results in an interruption of the optical signal which was being transmitted along sacrificial waveguide 12. As a result of breakage, the signal which is received by detector 16 and sensor circuit 18 differs from that which was originally emitted. Sensor circuit 18 then triggers the deployment of an air bag (not shown) within the vehicle in response to the difference in the optical signal.

When transmitting signals along waveguide 12, light modulation is preferably utilized to prevent deployment failure of the air bag. Light modulation techniques generally provide for the emission of encoded signals which are transmitted along waveguide 12, received by detector 16, and provided to sensor circuit 18. Light modulation is advantageous, particularly in instances when detector 16 receives an outside light not provided by emitter 14. When this outside light strikes detector 16, detector 16 may not sense a breakage to waveguide 12 since the light striking detector 16 remains continuous. As a result, the air bag deployment trigger sensor 10 may fail to trigger sensor circuit 18. To this end, detector 16 receives the outside light and may fail to generate a differential in the current of voltage signal in response to the breakage of waveguide 12, along with a corresponding drop in the intensity of light that occurs as a result of such breakage. By modulating or encoding the optical signal, detector 16 and sensor circuit 18 are capable of detecting differences in the light which strikes detector 16. As a result of encoding and modulation, light received by detector 16 and provided to sensor circuit 18 which has not been encoded will not result in a failure to trigger the air bag deployment system 20.

Breakage of the waveguide 12 may be regulated by, among other things, two major factors. First, although it is necessary to utilize a fixed waveguide 12 of a breakable material, the material of which the waveguide is comprised may be any of numerous materials having a variety of tensile strengths ranging from brittle to rigid depending upon the degree of sensitivity desired for triggering deployment of the air bag. For example, a more rigid waveguide will be arranged within sensitive areas of a vehicle to prevent deployment of the air bag upon slight impacts, while a brittle waveguide will be arranged in less sensitive areas of the vehicle so that impacts to these less sensitive areas or collisions which result from indirect impacts with a particular area of the vehicle nevertheless trigger deployment of the air bag.

Second, the distance of placement within the vehicle also affects the breakage of the waveguide 12. Placement of waveguide 12 near the exterior surface of a vehicle, such as directly beneath the surface of the door panels, will permit almost immediate breakage of waveguide 12 upon an impact which meets a predetermined threshold. Alternatively, placement of the waveguide 12 deeper within the vehicle, i.e. a greater distance from the exterior surface of the vehicle, will require a much greater impact to reach and break the waveguide and trigger air bag deployment.

Figure 4:
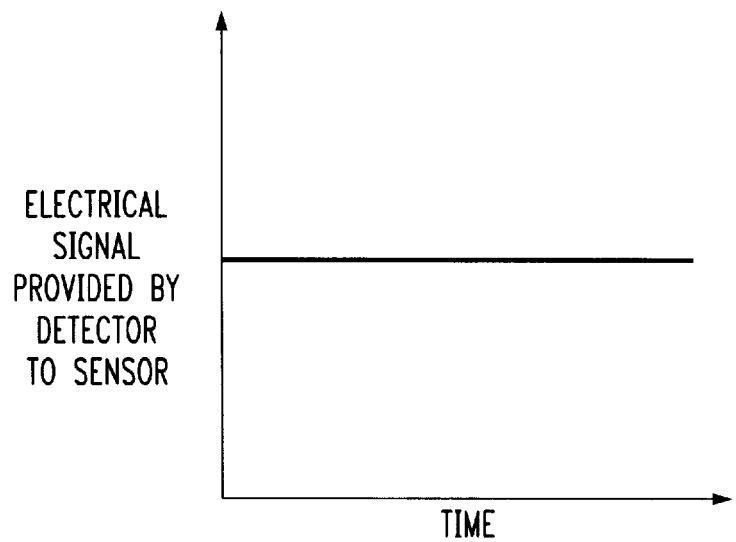
FIG. 4 illustrates a relationship between the time and the electrical signal provided by the detector to the sensor circuit under normal conditions.
Figure 5:
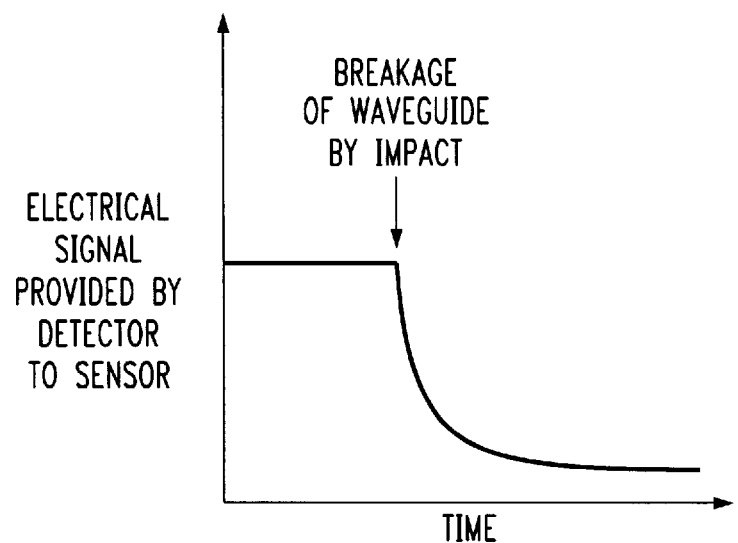
FIG. 5 illustrates a relationship between the time and the electrical signal provided by the detector to the sensor circuit when the waveguide is broken as a result of an impact.

FIG. 4 illustrates a relationship between time and the electrical signal, whether current or voltage, and whether continuous, pulsed or encoded, provided by detector 16 to sensor circuit 18 before impact. FIG. 5 illustrates a relationship between time and the signal provided by detector 16 to sensor circuit 18 after an impact causes the breakage of the waveguide 12. As will be easily seen from FIG. 5, breakage of the waveguide 12 disrupts or reduces the signal received drastically, which permits the sensor circuit 18 to detect the occurrence of the impact and trigger the deployment of an air bag within the vehicle.

Figure 6:
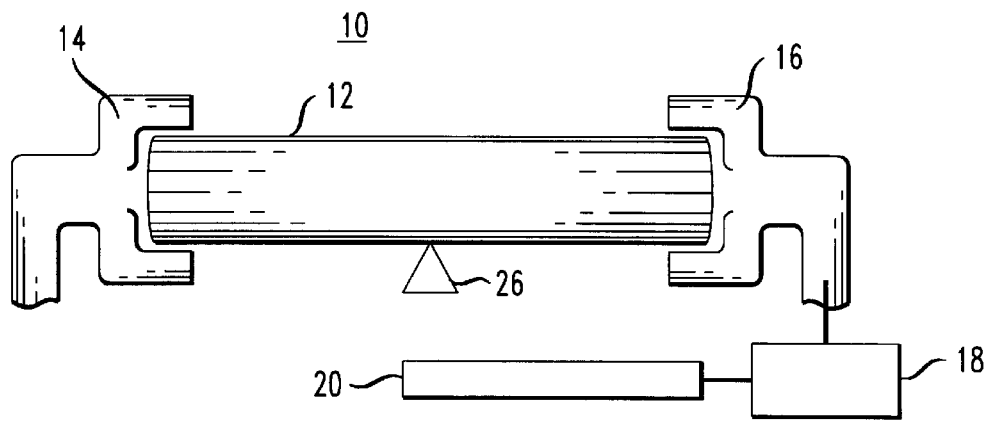
FIG. 6 illustrates an alternative embodiment of the present invention provided with an anvil.

FIG. 6 illustrates an alternative to the first embodiment illustrated in FIGS. 1–3. Since there may be certain areas of the vehicle which are less sensitive to direct impact than other areas, an air bag deployment trigger sensor 10 may be disposed within the less sensitive area and may be provided there with a knife or anvil 26 positioned at a point along sacrificial waveguide 12. Anvil 26 will generally be positioned at a less sensitive point along sacrificial waveguide 12 so that an impact in the vicinity of anvil 26 will cause anvil 26 to break waveguide 12 so that the optical signal being transmitted along waveguide 12 is altered or interrupted and in effect causing detector 16 and sensor circuit 18 to trigger deployment of an air bag in response to the impact.

Figure 7:
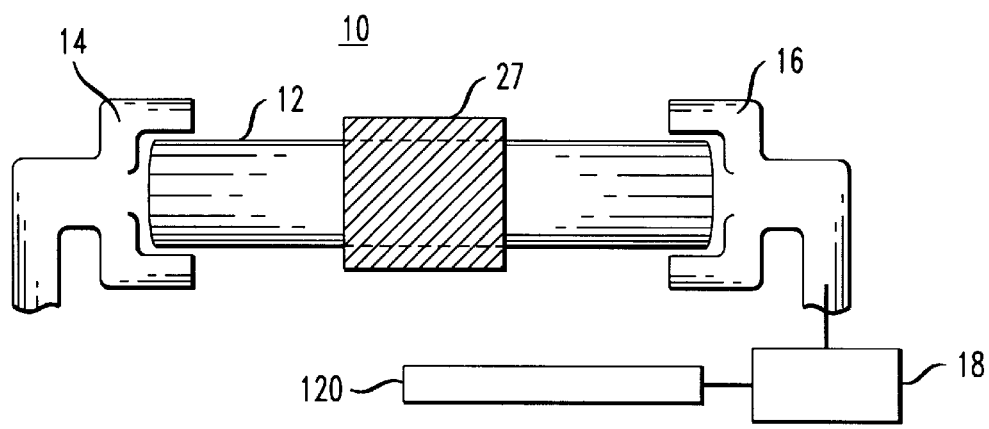
FIG. 7 illustrates an alternative embodiment of the present invention provided with an inertial weight affixed to the waveguide.

In FIG. 7 there is illustrated another alternative to the first embodiment illustrated in FIGS. 1–3. Because a certain area or areas of the vehicle may be less sensitive to direct impact than other areas, an air bag deployment trigger sensor 10 may be disposed within the less sensitive area(s) and may be provided there with an inertial weight 27 positioned at a point along sacrificial waveguide 12. Inertial weight 27 will generally be positioned at a strategic point along sacrificial waveguide 12 so that an impact in the vicinity of inertial weight 27 will cause inertial weight 27 to break waveguide 12 so that the optical signal being transmitted along waveguide 12 is altered or interrupted and in effect causing detector 16 and sensor circuit 18 to trigger deployment of an air bag in response to the impact.

Figure 8:
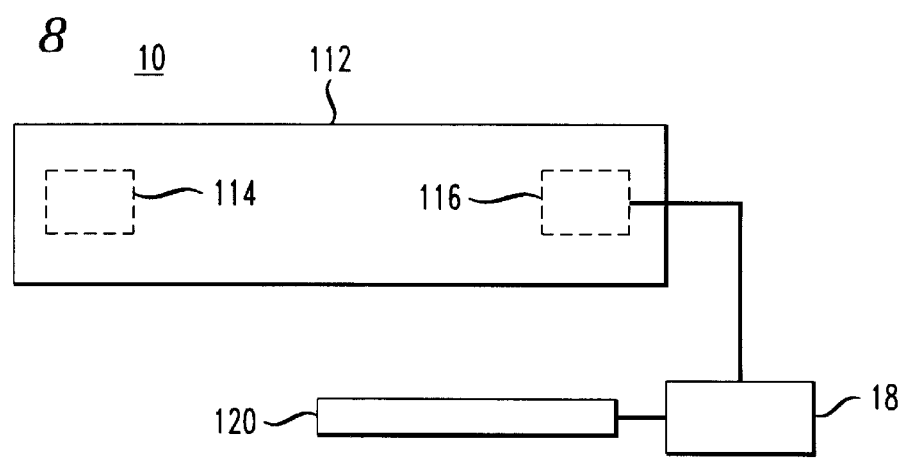
FIG. 8 illustrates an alternative embodiment of the present invention as configured as a single molded waveguide.

FIG. 8 illustrates an additional alternative embodiment of the air bag employment trigger sensor 10 of present invention as illustrated in FIGS. 1–3, in which emitter 114 and detector 116 are integrally molded into waveguide 112 forming a single integrated unit. In this embodiment, the integrally molded waveguide 112 may be formed on a silicon composition, although the invention is not limited in this respect, and other materials such as Indium-Gallium-Arsenide (InGaAs) or Germanium (Ge) may used to form the integrally molded waveguide. The construction and operation of silicon-based waveguides is well known and described in a review article in Laser Focus World, Apr. 1995 edition, pp. 97–98, which describes a micromachined silicon beam as an optical waveguide. As described in the publication, a single fabricated silicon surface layer 112 serves as the waveguide. An emitter 114 and detector 116, may be integrally fabricated within the a silicon surface layer 110. Emitter 114 within the silicon surface layer 112 is capable of emitting continuous, pulsed or encoded optical signals as described with reference to the other embodiments discussed hereinabove. Similarly, the silicon surface layer 112 transmits the emitted optical signals which are in turn received by detector 116. A sensor circuit 118 is arranged proximate to the silicon surface layer 112 within its place of arrangement within the vehicle. The silicon surface layer 112 is positioned within a vehicle in the same manner as the previous embodiments illustrated in FIGS. 1–4. An impact to an area of the vehicle wherein a single molded silicon surface layer 112 has been arranged results in the breakage of the entire silicon surface layer waveguide 112. The breakage of silicon surface layer 112 causes an interruption in the optical signal transmission which in turn causes sensor circuit 118 to trigger deployment of air bag deployment system 120 in response to the impact.

Although the embodiment of the present invention has been generally described with reference to its use and installation in automobiles, it may be installed and utilized equally well in other vehicles such as trucks and may be positioned within these vehicles wherever protection from impact is desired.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. An air bag triggering device, which comprises:
    a rigid optical waveguide disposed within the body of a vehicle for carrying optical rays;
    sensor means coupled to said optical waveguide, said sensor means triggering an air bag system when said optical waveguide breaks.

2. The air bag triggering device in accordance with claim 1, further comprising an emitter and a detector, wherein said emitter provides a light signal along said rigid optical waveguide to be received by said detector, the occurrence of an impact causing said optical waveguide to break such that said light signal is interrupted so as to trigger a signal for deployment of an air bag.

3. The air bag triggering device in accordance with claim 2, wherein the light signal is continuous.

4. The air bag triggering device in accordance with claim 2, wherein the light signal is pulsed.

5. The air bag triggering device in accordance with claim 2, wherein the light signal is encoded.

6. The air bag triggering device in accordance with claim 1, wherein said emitter is a laser diode optical emitter.

7. The air bag triggering device in accordance with claim 1, wherein said emitter is a laser emitting diode (LED).

8. The air bag triggering device in accordance with claim 1, wherein said detector is a photosensitive-type detector.

9. The air bag triggering device in accordance with claim 8, wherein said photosensitive-type detector is a Cadmium Sulfide (CdS) cell.

10. The air bag triggering device in accordance with claim 1, wherein said detector is a photodiode.

11. The air bag triggering device in accordance with claim 1, wherein said sensor means comprises a comparator for comparing an electrical signal corresponding to the light received by said detector with a predetermined electrical signal, such that said sensor means activates an air bag trigger when an impact causes the breakage of said rigid optical waveguide causing a change in said electrical signal corresponding to the light received by said detector.

12. The air bag triggering device in accordance with claim 1, wherein said sensor means comprises an amplifier, employed to amplify a voltage signal corresponding to the light received by said detector, such that said sensor means activates an air bag trigger when an impact causes the breakage of said rigid optical waveguide.

13. The air bag triggering device in accordance with claim 1, wherein said sensor means comprises an amplifier, employed to amplify a current signal corresponding to the light received by said detector, such that said sensor means activates an air bag trigger when an impact causes the breakage of said rigid optical waveguide.

14. The air bag triggering device in accordance with claim 1, wherein said sensor means comprises a decoder, such that said emitter transmits an encoded signal along said waveguide, said sensor means configured to receive said encoded signal, such that said sensor means activates an air bag trigger when the breakage of said rigid optical waveguide interrupts transmission of said coded signal received by said detector.

15. The air bag triggering device in accordance with claim 1, further comprising connecting means for mounting said rigid optical waveguide within a vehicle door assembly.

16. The air bag triggering device in accordance with claim 1, further comprising connecting means for mounting said rigid optical waveguide within a front bumper of a vehicle.

17. The air bag triggering device in accordance with claim 1, further comprising connecting means for mounting said rigid optical waveguide within a rear bumper of an vehicle.

18. The air bag triggering device in accordance with claim 1, further comprising connecting means for mounting said air bag triggering device in any strategic location within a vehicle.

19. The air bag triggering device in accordance with claim 1, further comprising an anvil disposed proximate said rigid optical waveguide and positioned at a predetermined point along the optical waveguide such that said anvil breaks said optical waveguide at said predetermined point upon the occurrence of an impact.

20. The air bag triggering device in accordance with claim 1, further comprising an inertial weight disposed proximate said rigid optical waveguide and positioned at a predetermined point along the optical waveguide such that said inertial weight breaks said optical waveguide at said predetermined point upon the occurrence of an impact.

21. The air bag triggering device in accordance with claim 1, wherein said rigid optical waveguide is a single molded waveguide.

22. The air bag triggering device in accordance with claim 21, wherein said rigid optical waveguide is a single molded waveguide comprised of an optically transmitting material selected from the group consisting of Silicon (Si), Indium-Gallium-Arsenide (InGaAs) or Germanium (Ge).

23. The air bag triggering device in accordance with claim 22, wherein said single molded waveguide layer further comprises an emitter and a detector integrally fabricated within said single molded waveguide for transmitting an optical signal therebetween, said silicon surface layer mountable within a vehicle, the occurrence of an impact causing the single molded waveguide to break such that a light signal is interrupted so as to trigger a signal for deployment of an air bag.

24. A method of triggering an air bag, said method comprising the steps of:

emitting optical rays from an optical emitter, transmitting said optical rays along a rigid waveguide;

detecting said optical rays;

sensing the breakage of said waveguide; and triggering deployment of an air bag in response to said breakage.

25. The method as recited in accordance with claim 24, wherein said step of emitting optical rays further comprises the step of encoding the optical rays using light modulation techniques.

26. The method as recited in claim 24, wherein said step of detecting said optical rays further comprises the step of converting said optical rays into a voltage signal.

27. The method as recited in claim 24, wherein said step of detecting said optical rays further comprises the step of converting said optical rays into a current signal.

28. The method in accordance with claim 24, wherein the step of sensing the breakage of said waveguide, further comprises the step of receiving said voltage signal from said detector.

29. The method in accordance with claim 24, wherein the step of sensing the breakage of said waveguide, further comprises the step of receiving said current signal from said detector.

* * * * *